United States Patent
Hirano et al.

(10) Patent No.: US 10,866,168 B2
(45) Date of Patent: Dec. 15, 2020

(54) PLASTIC REFERENCE MATERIAL AND METHOD OF MANUFACTURING THE SAME

(71) Applicant: HITACHI HIGH-TECH SCIENCE CORPORATION, Tokyo (JP)

(72) Inventors: Yoshihiro Hirano, Tokyo (JP); Kenji Namiki, Tokyo (JP); Noriaki Sakai, Tokyo (JP)

(73) Assignee: HITACHI HIGH-TECH SCIENCE CORPORATION, Tokyo (JP)

(*) Notice: Subject to any disclaimer, the term of this patent is extended or adjusted under 35 U.S.C. 154(b) by 134 days.

(21) Appl. No.: 16/274,653

(22) Filed: Feb. 13, 2019

(65) Prior Publication Data

US 2019/0257722 A1    Aug. 22, 2019

(30) Foreign Application Priority Data

Feb. 16, 2018 (JP) ................. 2018-025834

(51) Int. Cl.
| | |
|---|---|
| *G01N 1/28* | (2006.01) |
| *G01N 30/12* | (2006.01) |
| *G01N 30/84* | (2006.01) |
| *G01N 30/72* | (2006.01) |
| *G01N 30/04* | (2006.01) |
| *G01N 30/02* | (2006.01) |

(52) U.S. Cl.
CPC ............... *G01N 1/28* (2013.01); *G01N 30/04* (2013.01); *G01N 30/12* (2013.01); *G01N 30/7206* (2013.01); *G01N 30/84* (2013.01); *G01N 2001/2893* (2013.01); *G01N 2030/025* (2013.01); *G01N 2030/045* (2013.01); *G01N 2030/126* (2013.01); *G01N 2030/8405* (2013.01)

(58) Field of Classification Search
CPC .......... G01N 1/28; G01N 30/04; G01N 30/12; G01N 30/84
See application file for complete search history.

(56) References Cited

U.S. PATENT DOCUMENTS

2018/0275026 A1* 9/2018 Hirano .................. G01N 1/286

FOREIGN PATENT DOCUMENTS

JP    2012-208081 A    10/2012

* cited by examiner

*Primary Examiner* — Jamel E Williams
(74) *Attorney, Agent, or Firm* — Holland & Hart LLP

(57) ABSTRACT

The present invention relates to a plastic reference material and a method of manufacturing the same, wherein the concentration of at least one chemical substance is characterized from a signal intensity of the chemical substance and a signal intensity of the isotope-labeled chemical substance of the chemical substance obtained using the pyrolysis GC-MS instrument by weighing a mass of a candidate material for the plastic reference material using a balance, weighing an isotope-labeled chemical substance of the chemical substance using a balance, preparing a mixed solution by dissolving the weighed candidate material for the plastic reference material and the weighed isotope-labeled chemical substance in a solvent, introducing a product resulting from evaporation of the solvent from the mixed solution into a pyrolysis GC-MS instrument, and calculating the concentration of the chemical substance included in the candidate material for the plastic reference material.

3 Claims, 5 Drawing Sheets

| Repetition No. | BBP Quantitative value (mg/kg) |
|---|---|
| 1 | 1082 |
| 2 | 1080 |
| 3 | 1057 |
| 4 | 1066 |
| 5 | 1081 |
| Average | 1073 |
| CV | 1.0% |

| Repetition No. | BBP Quantitative value (mg/kg) |
|---|---|
| 1 | 1010 |
| 2 | 1196 |
| 3 | 1084 |
| 4 | 1012 |
| 5 | 1101 |
| Average | 1080 |
| CV | 7.1% |

FIG. 5

| Sampling No. | BBP Quantitative value (mg/kg) |
|---|---|
| 1 | 1079 |
| 2 | 1083 |
| 3 | 1075 |
| 4 | 1054 |
| 5 | 1079 |
| 6 | 1075 |
| 7 | 1073 |
| Average | 1074 |
| CV | 0.9% |

FIG. 6

| Chemical substance | DIBP | DBP | BBP | DEHP |
|---|---|---|---|---|
| Certified value (mg/kg) | 1001 | 997 | 1000 | 998 |
| Uncertainty of certified value (mg/kg) | ±120 | ±120 | ±120 | ±120 |
| 95% confidence interval of certified value (mg/kg) | 881~1121 | 877~1117 | 880~1120 | 876~1116 |
| Quantitative results without correction (mg/kg) | 1122 | 1048 | 1082 | 1058 |
| Quantitative results with correction (mg/kg) | 1013 | 993 | 1033 | 1003 |

FIG. 7

Test report

Test item: ABS reference material

Test result: BBP concentration 1073 mg/kg

Test method: Isotope dilution – Pyrolysis gas chromatography mass spectrometry

Test date: January 31, 2017

FIG. 8

PLASTIC REFERENCE MATERIAL AND METHOD OF MANUFACTURING THE SAME

CROSS REFERENCE TO RELATED APPLICATION

This application claims the benefit of Japanese Patent Application No. JP 2018-025834, filed Feb. 16, 2018, which is hereby incorporated by reference in its entirety into this application.

BACKGROUND OF THE INVENTION

1. Technical Field

The present invention relates to a reference material for use in analyzing a chemical substance contained in a sample and a method of manufacturing the same, and particularly to a reference material characterization method.

2. Description of the Related Art

Recently, a variety of plastic reference materials have been developed in order to analyze hazardous substances including endocrine disruptors (extrinsic endocrine disruptors) added to plastic products and to measure chemical substances in plastic materials.

The term "reference material" refers to "material, sufficiently homogeneous and stable with respect to one or more specified properties, which has been established to be fit for its intended use in a measurement process", as defined in [Terms and definitions] of ISO GUIDE 30. Hence, in the development or preparation of reference materials, the process of determining the characteristic value is indispensable. In general, the process of determining the characteristic value may also be called characterization.

As a method of directly analyzing an organic compound among chemical substances contained in a plastic material, pyrolysis gas chromatography (pyrolysis GC), pyrolysis gas chromatography mass spectrometry (pyrolysis GC-MS), etc. have been used. Here, a solid sample is heated, whereby components contained in the sample are evaporated, and the evaporated components are analyzed using a GC or GC-MS instrument.

As such, if the amount of the sample that is introduced is large, the plastic material itself, which is the main component, is evaporated in a large amount, interfering the measurement, and thus the sample mass is typically set to about 0.5 mg or less and is used in an extremely small amount, about 0.5 mg or less. Hence, plastic reference materials suitable for introducing in a small amount and methods of manufacturing the same have been proposed.

For example, a reference material is manufactured in a manner in which a blank resin solution and a standard solution are prepared, injected in amounts of 20 μL and 1 μL, respectively, into a sample cup, and then dried in air (Paragraph [0057] of Patent Document 1, in which μm is presumed to be an error in writing of L).

Meanwhile, the highly precise analysis method used for the characterization of a reference material is mainly exemplified by isotope dilution mass spectrometry. Isotope dilution mass spectrometry is called as a primary method, together with coulometry, gravimetry, titration, and freezing point depression, and is considered to have very high metrological quality. In isotope dilution mass spectrometry, a certain amount of an isotope-labeled chemical substance is added to a sample, followed by mass spectrum analysis, after which the amount of unknown component in the sample is calculated based on the obtained isotope-labeled chemical substance signal.

CITATION LIST

Patent Literature (Patent Document 1) Japanese Patent Application Publication No. 2012-208081

SUMMARY OF THE INVENTION

Patent Document 1 discloses a process of manufacturing a reference material, including measuring a certain volume (20 μL and 1 μL) of liquid. In general, volume measurement using a volumetric ware has problems of complicated operation and large measurement error compared to mass measurement using a balance.

Further, since the volume measurement value of the above Patent Document is used for the subsequent calculation procedure, there is a problem that the error of the characterization result becomes large.

Accordingly, an objective of the present invention is to provide a plastic reference material, the manufacture of which is simple and with which characterization is performed with low error, and a method of manufacturing the same.

In order to accomplish the above objective, the present invention provides a plastic reference material, in which the concentration of a chemical substance is calculated by: weighing a mass of a candidate material for the plastic reference material using a balance, weighing an isotope-labeled chemical substance of the chemical substance using a balance, preparing a mixed solution by dissolving the weighed candidate material for the plastic reference material and the weighed isotope-labeled chemical substance in a solvent, introducing a product resulting from evaporation of the solvent from the mixed solution into a pyrolysis GC-MS instrument, and calculating the concentration of the chemical substance included in the candidate material for the plastic reference material from a signal intensity of the chemical substance and a signal intensity of the isotope-labeled chemical substance obtained using the pyrolysis GC-MS instrument.

Thereby, the characterization is performed using mass measurement and pyrolysis GC-MS, without using volume measurement values, and thus the plastic reference material is obtained through highly reliable characterization with low error.

In addition, the present invention provides a method of manufacturing a plastic reference material, comprising characterizing the concentration of a chemical substance through calculation from the mass of a plastic reference material candidate sample measured using a balance, the mass of an isotope-labeled chemical substance of the chemical substance measured using a balance, and signal intensities measured using a pyrolysis GC-MS instrument.

Also, the method of manufacturing the plastic reference material according to the present invention may further comprise: weighing the mass of the chemical substance to be measured and the mass of the isotope-labeled chemical substance of the chemical substance, dissolving the chemical substance, the isotope-labeled chemical substance of the chemical substance, and a plastic base material in a solvent, introducing a product resulting from evaporation of the solvent into a pyrolysis GC-MS instrument, determining a sensitivity correction factor of the chemical substance to be measured and the isotope-labeled chemical substance of the chemical substance, and correcting the concentration of the chemical substance.

According to the present invention, it is possible to manufacture a plastic reference material which is accurately characterized through a quantitative process using an isotope-dilution substance, without using complicated volume measurement values containing large errors.

Additional problems, constitutions and effects other than the foregoing are clarified by the following description of the embodiments.

BRIEF DESCRIPTION OF DRAWINGS

FIG. 5 shows the results of repeated measurement of the ABS reference material candidate sample through pyrolysis GC-MS using a calibration curve method;

FIG. 6 shows the measurement results of seven sampling procedures in the present embodiment;

FIG. 7 shows the certified values of a certified reference material and the quantitative results according to the present embodiment; and FIG. 8 shows an example of a test report on a reference material manufactured according to an embodiment of the present invention.

DESCRIPTION OF SPECIFIC EMBODIMENTS

Figure 1:
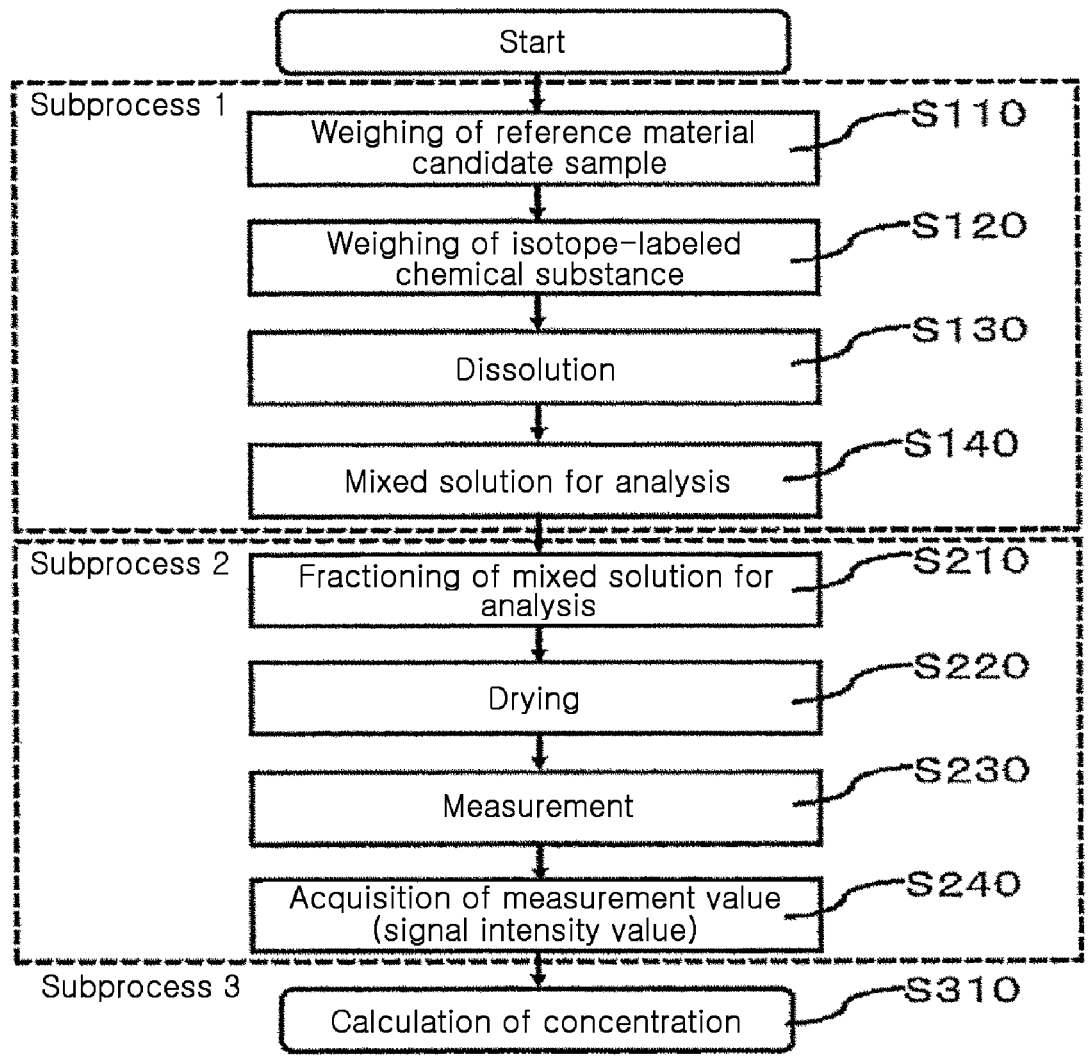
FIG. 1 is a flowchart of a concentration calculation (characterization) process of a reference material candidate sample according to an embodiment of the present invention.

Hereinafter, a detailed description will be given of an embodiment of the present invention with reference to the drawings.

A plastic reference material is made by dispersing at least one chemical substance in a plastic base material serving as a matrix. The plastic base material is not particularly limited, so long as it is soluble in a solvent, and examples thereof include acrylonitrile.butadiene.styrene copolymer resin (ABS resin), polyvinyl chloride (PVC), polyethylene, polypropylene, polycarbonate, polystyrene, polyester, polyethylene terephthalate, epoxy resin, acrylic resin, and polyurethane. Examples of the solvent include tetrahydrofuran (THF), acetone, xylene, chloroform, butyl acetate, toluene, phenol, benzene, and methyl ethyl ketone.

According to an embodiment of the present invention, a method of manufacturing the plastic reference material is described below. The method of manufacturing the plastic reference material according to an embodiment of the present invention includes preparing a reference material candidate sample by forming a plastic chip (a reference material candidate sample) in which at least one chemical substance is uniformly dispersed in a plastic base material, and calculating the concentration of the chemical substance in the reference material candidate sample using signal intensity values through mass measurement and pyrolysis GC-MS.

In the preparation of the reference material candidate sample, at least one chemical substance is uniformly dispersed in the plastic base material using any type of known kneading process.

First, provided as the reference material candidate sample is an ABS resin chip in which benzyl butyl phthalate (BBP) is dispersed at a concentration of about 1000 mg/kg. The chip is prepared as follows through a known technique using a commercially available extrusion kneader.

For the preparation of the reference material candidate sample, about 1.5 g of BBP (made by Tokyo Chemical Industry Co., Ltd.) and about 1.5 kg of ABS resin (ABS150NP, made by Techno Polymer Co., Ltd.) are mixed, placed in an extrusion kneader, and kneaded into a compound. Subsequently, the string-shaped compound extruded from the extrusion kneader is placed in a water bath, cooled, and then pulled into a cutter and thus cut, thereby forming a chip having a diameter of about 3 mm and a length of about 3 mm.

In order to uniformly disperse BBP, the procedures of kneading the obtained chip again using the extrusion kneader and then forming the same chip are repeated three times. Furthermore, the initial compound extruded from the extrusion kneader is discarded owing to concern about insufficient mixing. Hence, the chip thus obtained weighs about 1.2 kg.

Thereafter, the chip is placed again in the extrusion kneader, and the resulting chip is determined to be a reference material candidate sample. Here, the size of the chip may vary depending on the extrusion speed of the extrusion kneader and the pulling speed and cutting speed of the cutter. The reference material candidate sample is formed with a diameter of about 0.5 mm and a length of about 1 mm by decreasing the extrusion speed of the extruder and increasing the cutting speed under the condition that the pulling speed of the cutter is fixed during the final extrusion kneading process. As such, chips formed during the procedures of adjusting the speed of the extruder and the cutting speed of the cutter are discarded because the size thereof is non-uniform. Consequently, the chip thus obtained weighs about 100 g.

Next, calculating the concentration according to the present embodiment is described with reference to the drawing.

In the embodiment of the present invention, the plastic reference material is determined by measuring at least the concentration of the chemical substance contained therein (per unit mass of plastic reference material). The concentration may be, for example, a value per unit mass of a pellet described later, but the present invention is not limited thereto, and, for example, a concentration per unit volume may be applied.

FIG. 1 shows the concentration calculation process. In subprocess 1 for preparing a mixed solution for analysis, the step of weighing the reference material candidate sample is performed in a manner in which about 2 g is taken from about 100 of the ABS chip as the reference material candidate sample prepared as above, and the mass A thereof is measured (precisely weighed) using an electronic balance capable of performing measurements with a precision of 0.00001 g (0.01 mg) (S110). The measured value was 2.00024 g. The weighed sample is placed in a 100 mL glass bottle with a cap.

Subsequently, the step of weighing the isotope-labeled chemical substance is performed in a manner in which mass B of about 0.003 g of isotope-labeled BBP (Benzyl Butyl Phthalate-d4 Standard, made by FUJIFILM Wako Pure Chemical Corporation, and represented as BBP-d4 herein) is measured (precisely weighed) using an electronic balance capable of performing measurements with a precision of 0.0000001 g (0.1 μg) (S120), and then placed in the glass bottle.

As such, when some of the BBP-d4 is left behind in the state of being attached to the vessel used for mass measurement, it becomes a source of error in the calculation of the mass of the mixed sample. Hence, the following method is employed.

Figures 3, 4:
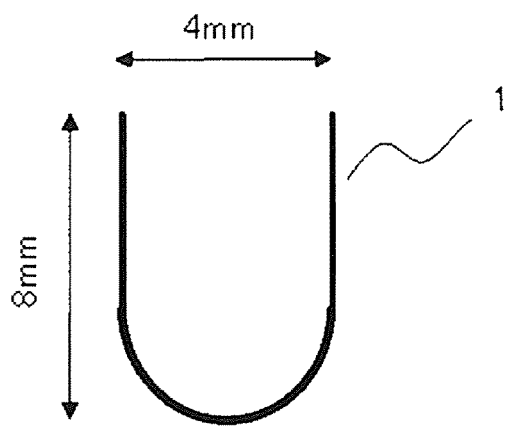
FIG. 3 is a cross-sectional view showing a cup-shaped vessel for use in an embodiment of the present invention.
FIG. 4 shows the results of repeated measurement of the ABS reference material candidate sample through pyrolysis GC-MS in the present embodiment.

As a vessel for mass measurement using an electronic balance, a stainless-steel cup-shaped vessel (having a volume of about 50 μL), which is a commercially available sample vessel for pyrolysis GC-MS, is used. The cross-sectional view thereof is shown in FIG. 3. After taring the weight of the vessel in advance with an electronic balance, a fraction of BBP-d4 is placed in the vessel using a micropipette, and mass B of BBP-d4 is measured. The value thereof was 0.0025998 g (2.5998 mg). The vessel with the BBP-d4 fraction is placed in the glass bottle.

Subsequently, about 40 mL of THF (made by FUJIFILM Wako Pure Chemical Corporation), serving as a solvent, is placed in the glass bottle using a measuring cylinder.

Here, the sequence of placing the precisely weighed ABS chip, precisely weighed BBP-d4, and about 40 mL of THF in the glass bottle is not limited to the foregoing, and any sequence may be applied.

In the subsequent dissolution step, it takes time to completely dissolve the ABS chip. Thus, the glass bottle is closed with a cap, allowed to stand overnight and then stirred well (S130), and the resulting solution is used as a mixed solution for analysis (S140).

The mass of the BBP contained in the mixed solution for analysis in the glass bottle is unknown, but if it is Y, the BBP concentration Z in the ABS chip is represented as Z=Y/A. As such, the ratio (Y/B) of the mass of BBP and the mass of BBP-d4 in the mixed solution for analysis is determined. Even when the solution is diluted, even when the solvent is evaporated, or even when only a portion of the solution is used, Y/B does not change, which is the principle used in the present invention.

Based on this principle, it is not necessary to determine an accurate volume using a precise volumetric ware such as a volumetric flask or the like upon addition of about 40 mL of THF. The concentration Z of BBP in the ABS chip may be calculated from the mass A of the ABS chip and the mass B of BBP-d4, placed in the glass bottle, and the signal intensity C of BBP and the signal intensity D of BBP-d4 through pyrolysis GC-MS.

Next, in subprocess 2 for acquiring a measurement value, the step of fractioning the mixed solution for analysis is performed in a manner in which about 2 μL of the mixed solution for analysis prepared in subprocess 1 is placed in a sample vessel for pyrolysis GC-MS using a micropipette (S210), and then dried at room temperature for about 1 hr (S220). As such, there is no need to accurately dispense 2 μL. Furthermore, no mass measurement is required. This is because, as described in subprocess 1, the concentration of BBP is calculated using the mass A of the ABS chip and the mass B of BBP-d4, placed in the glass bottle, and the signal intensities (C and D) through pyrolysis GC-MS, and is not dependent on the amount of the sample injected into the vessel.

In the subsequent measurement step, the vessel containing the dried sample is introduced into a pyrolysis GC-MS instrument to measure the signal intensity C corresponding to BBP and the signal intensity D corresponding to BBP-d4, which is an isotope-labeled chemical substance (S230).

Consequently, the signal intensities C and D of BBP (m/z=149) and BBP-d4 (m/z=153) were measured to be $1.117 \times 10^9$ cps and $1.362 \times 10^9$ cps, respectively (S240).

In subprocess 3 for calculating the concentration, BBP and BBP-d4 of the same mass are regarded as causing the same signal intensity upon pyrolysis GC-MS. Furthermore, the signal intensity is considered to be in proportion to the mass of BBP or BBP-d4. Then, the ratio of the signal intensity C and the signal intensity D measured in subprocess 2, namely C/D, designates the ratio of the mass of BBP and the mass of BBP-d4 in the sample placed in the pyrolysis GC-MS instrument. Moreover, C/D designates the ratio of the mass Y of BBP and the mass B of BBP-d4 in the mixed solution for analysis prepared in subprocess 1. Briefly, the relationship of Y/B=C/D is established. Thus, the mass Y of BBP in the mixed solution for analysis is determined based on Y=B×C/D. Also, since the mass of the reference material candidate sample (ABS chip) in the mixed solution for analysis is A, the concentration Z of BBP in the ABS chip having the mass A is determined based on Z=Y/A=B×C/D/A. When Z is calculated by substituting the actual values into A, B, C, and D, Z equals $0.0025998 \times (1.117 \times 10^9)/(1.362 \times 10^9)/2.00024 = 0.001066$ g/g.

Further, when the concentration unit is mg/kg, it becomes 1066 mg/kg (S310).

In subprocess 2, the vessel containing the sample is introduced into the pyrolysis GC-MS instrument and the obtained signal intensity is used as it is. As such, the correction value resulting from subtracting the signal intensity obtained by additionally performing a blank test may be used.

As described above, C/D designates the ratio of the mass of BBP and the mass of BBP-d4 in the measurement sample introduced into the pyrolysis GC-MS instrument. The signal intensity of each of BBP and BBP-d4 through pyrolysis GC-MS varies depending on the amount (about 2 μL) of the sample that is added into the sample vessel. However, since the mass ratio of BBP and BBP-d4 in the added sample is constant, the resulting C/D does not depend on the amount of the sample that is added, but becomes constant. Furthermore, C/D is the ratio of the mass of BBP and the mass of BBP-d4 in the mixed solution for analysis prepared in subprocess 1, and even when the amount of THF that is added during the preparation process is increased or decreased, the C/D ratio is always constant. Hence, the volume of THF that is added in subprocess 1 and the volume of the sample that is injected into the sample vessel in subprocess 2 do not need to be accurately weighed.

In the above embodiment, it is possible to simply perform the characterization process through the isotope dilution mass spectrometry from the mass measurement value using the balance and the measurement value through pyrolysis GC-MS without the need to accurately measure the volume.

Pyrolysis GC-MS is GC-MS in which a pyrolysis device is installed at a sample inlet, and since the pyrolyzed measurement material (a mixture of different components) is separated into individual components by GC (gas chromatography), followed by MS (mass spectrometry), each component separated by GC in MS may be specifically identified (qualified) and quantified, making it easy to identify and quantify a single component of interest through complementary actions.

FIG. 4 shows the result of repeated measurement of the ABS reference material candidate sample through pyrolysis GC-MS according to the present embodiment. Also, FIG. 5 shows the result of repeated measurement using the calibration curve method through pyrolysis GC-MS without adding the isotope-labeled chemical substance to the same sample. Since the isotope-labeled chemical substance added in the present embodiment acts as an internal standard in pyrolysis GC-MS, variation in the introduced sample amount may be corrected, and moreover, variation in instrument sensitivity may be corrected, and thus the deviation of the quantitative value may be reduced. The coefficient of variation (CV) of the repeated measurement is 7.1% in FIG. 5, but is 1.0% in FIG. 4, from which it can be found that the deviation of the quantitative value in the present embodiment is reduced and thus very small.

FIG. 6 shows the result of calculation of the BBP concentration by the process shown in FIG. 1 for each of seven sampling processes for taking about 2 g from about 100 g of the reference material candidate sample. The deviation of the BBP quantitative value at each sampling No. is small and the BBP concentration in the reference material candidate sample is sufficiently uniform.

Figure 2:
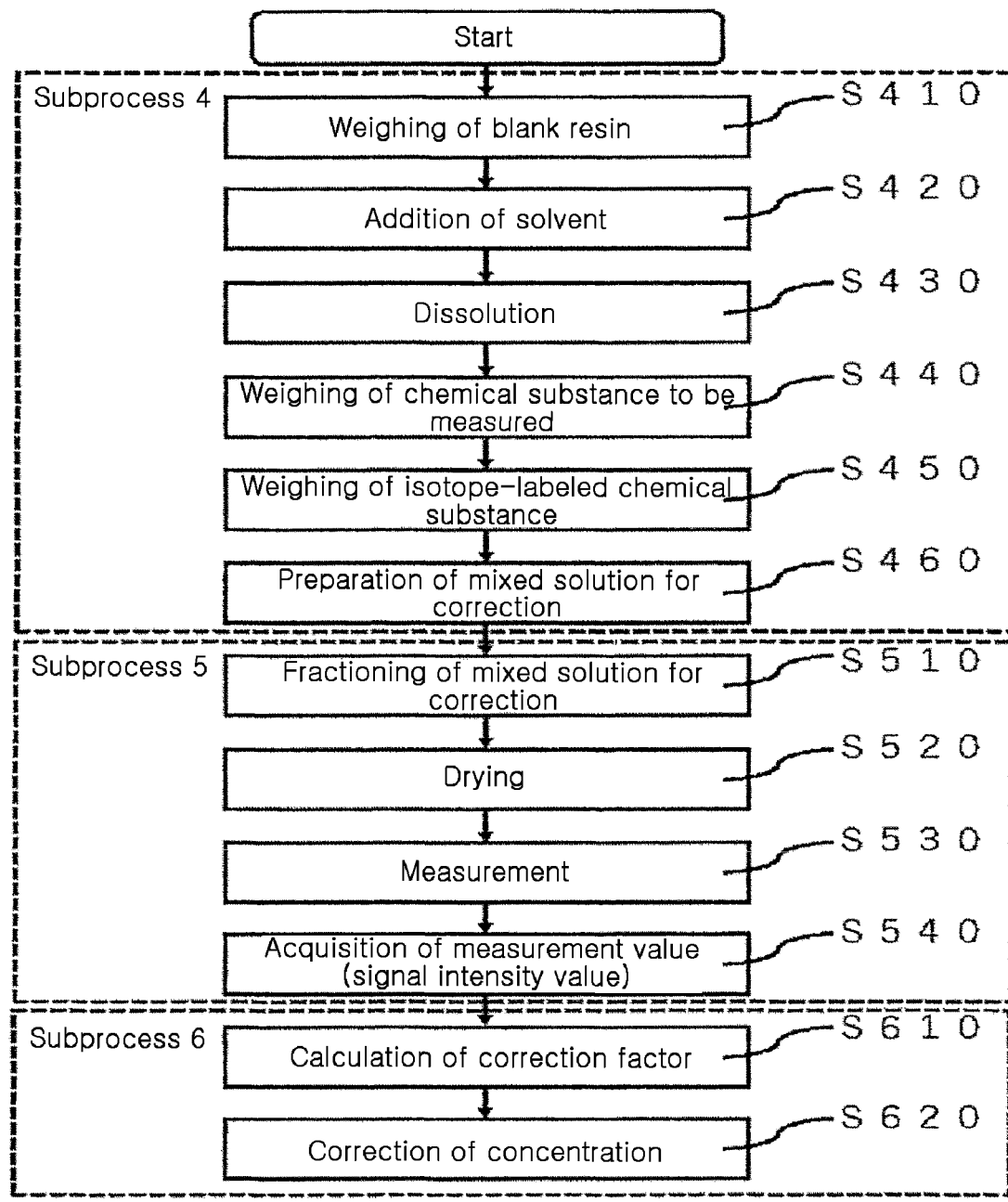
FIG. 2 is a flowchart of a concentration correction process using a correction factor according to an embodiment of the present invention.

Furthermore, in the description of subprocess 3, concentration calculation is carried out under the condition that BBP and BBP-d4 of the same mass are regarded as causing the same signal intensity upon pyrolysis GC-MS. On the other hand, in order to perform more accurate measurement, it is possible to perform sensitivity correction under the condition that BBP and BBP-d4 of the same mass are regarded as causing different signal intensities. This method is described with reference to FIG. 2.

In subprocess 4 for preparing a mixed solution for correction, in order to acquire the signal intensity per unit mass of BBP and BBP-d4 using the pyrolysis GC-MS instrument in the present embodiment, a THF solution, including a chemical-substance-free blank ABS resin, BBP and BBP-d4, is prepared in a similar sequence described in subprocess 1.

In the step of weighing the blank resin, the mass E of about 2 g of the chemical-substance-free blank ABS resin is precisely weighed using an electronic balance capable of performing measurements with a precision of 0.00001 g (0.01 mg). The measured value E was 1.98520 g (S410). Subsequently, in the step of adding the solvent, the resin is placed in a 100 mL glass bottle with a cap, and about 40 mL of THF is weighed using a measuring cylinder and then added thereto (S420). Also, the mass E of the ABS resin measured here is precisely weighed so as to be as close as possible to the processing condition of the ABS chip to be characterized, but the value of mass E is not used in subsequent calculations.

Subsequently, in the step of weighing a chemical substance to be measured, after taring the weight of the stainless-steel cup-shaped vessel (having a volume of about 50 µL) using an electronic balance capable of performing measurements with a precision of 0.0000001 g (0.1 µg), about 0.003 g of BBP is dispensed, the mass F of BBP is precisely weighed, and the cup-shaped vessel with the BBP fraction is placed in a glass bottle (S440). The measured value of the mass F was 0.0025182 g. Likewise, in the step of weighing an isotope-labeled chemical substance, about 0.003 g of BBP-d4 is dispensed in another cup-shaped vessel, the mass G of BBP-d4 is precisely weighed, and the cup-shaped vessel with the BBP-d4 fraction is placed in the glass bottle. The measured value of the mass G was 0.0024169 g (S450).

Here, the sequence of placing the precisely weighed blank ABS resin, about 40 mL of THF, precisely weighed BBP, and precisely weighed BBP-d4 in the glass bottle is not limited to the foregoing, and any sequence may be applied.

Subsequently, in the step of preparing a mixed solution for correction, it takes time to completely dissolve the ABS resin, and thus the glass bottle is closed with a cap, allowed to stand overnight and then stirred well, and the resulting solution is used as a mixed solution for correction (S460).

Next, in subprocess 5 for acquiring a measurement value, in the step of fractioning the mixed solution for correction, about 2 µL of the mixed solution for correction thus obtained is dispensed using a micropipette and placed in a new cup-shaped vessel (S510), and then dried at room temperature for about 1 hr (S520). In the subsequent measurement step, a signal intensity K corresponding to BBP and a signal intensity L corresponding to BBP-d4 are measured using the pyrolysis GC-MS instrument (S530). Consequently, the signal intensity K was $1.173 \times 10^9$, and the signal intensity L was $1.084 \times 10^9$ (S540).

In subprocess 6 for correcting the concentration, in the step of calculating a correction factor, signal intensity per unit mass of BBP is calculated by K/F. and signal intensity per unit mass of BBP-d4 is calculated by UG. The process of FIG. 1 is carried out under the assumption that the signal intensities of BBP and BBP-d4 of the same mass are the same. Here, when the sensitivities of BBP and BBP-d4 of the same mass are different, the correction factor for converting the signal intensity of BBP into a signal intensity equivalent to BBP-d4 is expressed as (UG)/(K/F)=(LF)/(KG).

When the above values are substituted into the above equation, the sensitivity correction factor is (LF)/(KG) =0.963. The correction value Zc of the mass Z of BBP is calculated as Zc=0.963×Z (S610). The quantitative value of FIG. 4 is determined by Z/A, and the average value is 1073 mg/kg. In the concentration correction step, 1073× 0.963=1033 mg/kg results (S620).

Upon determining the correction factor according to the present embodiment, BBP and BBP-d4 are dispensed such that the mass F of BBP and the mass G of BBP-d4 are almost equal. Here, when the purity of BBP-d4 used is not 100% and a small amount of BBP is contained as an impurity, a portion of the mass G of BBP-d4 is BBP, the measured signal intensity L of BBP-d4 is decreased, and the signal intensity K of BBP is increased.

In the measurement of the reference material candidate sample for characterization through the process of FIG. 1, when BBP-d4 is added in almost the same amount as BBP estimated in the sample, signal intensity D (decreased) of BBP-d4 and signal intensity C (increased) of BBP are increased or decreased at the same ratio by BBP contained as an impurity in BBP-d4. Ultimately, it is possible to correct the concentration using the obtained sensitivity correction factor. Even when the purity of BBP-d4 that is used is not 100%, accurate correction using the sensitivity correction factor may be expected.

Various methods have been proposed to increase the reliability of quantitative values in the sequence or calculation equation for quantification using isotope dilution mass spectrometry, and the present invention is not limited to specific methods.

In the present embodiment, the concentration of a single kind of chemical substance is determined. However, it is not necessary for the chemical substance dispersed in the plastic base material to be a single kind, and in the case of a plastic base material containing various kinds of chemical substances, pyrolysis GC-MS measurement of multiple components in the same sequence is performed, whereby the concentration calculation is possible.

In the process of the embodiment described above, the reliability of the quantitative value may be confirmed using a commercially available certified reference material instead of the ABS chip. An example thereof is described below.

As a commercially available certified reference material, a polyvinyl chloride (PVC) reference material, namely SVO-STC-93-5, made by SPEX, is used. To obtain the sensitivity correction factor, a blank PVC powder is used instead of the blank ABS resin.

In addition to BBP as the chemical substance to be evaluated, diisobutyl phthalate (DIBP), dibutyl phthalate (DBP), and di-2-ethylhexyl phthalate (DEHP) evaluation are used, respective isotope-labeled chemical substances thereof are used, and measurement is performed.

FIG. 7 shows the certified values of the certified reference material and the quantitative results thereof according to the present embodiment. The quantitative results of individual components fall almost in the 95% confidence interval of certified values even without correction by the sensitivity correction factor, and results having high reliability are obtained. Moreover, in the quantitative results with correction by the sensitivity correction factor, all of the values of individual components are closer to the certified values, and results having higher reliability are obtained.

Through the aforementioned process, the reference material candidate sample (ABS resin chip) prepared in the present embodiment may become a material in which the BBP concentration, which is the characteristic value thereof, is sufficiently uniform and appropriately determined, that is, a reference material.

In general, the characteristic value of the reference material is supplied together with the reference material by any document such as a test report, analytical report or certificate. FIG. 8 shows a description example of a test report when the ABS resin chip described in the present embodiment is supplied as a reference material.

What is claimed is:

1. A plastic reference material made by dispersing at least one chemical substance in a plastic base material and used for analyzing a concentration of the at least one chemical substance,
    wherein the concentration of the at least one chemical substance is characterized by:
    weighing a mass of a candidate material for the plastic reference material,
    weighing an isotope-labeled chemical substance of the at least one chemical substance,
    preparing a mixed solution by dissolving the weighed candidate material for the plastic reference material and the weighed isotope-labeled chemical substance in a solvent,
    introducing a product resulting from evaporation of the solvent from the mixed solution into a pyrolysis gas chromatography-mass spectrometry (GC-MS) instrument, and
    calculating the concentration of the at least one chemical substance included in the candidate material for the plastic reference material from a signal intensity of the at least one chemical substance and a signal intensity of the isotope-labeled chemical substance of the at least one chemical substance obtained using the pyrolysis GC-MS instrument.

2. A method of manufacturing a plastic reference material made by dispersing at least one chemical substance in a plastic base material and used for analyzing a concentration of the at least one chemical substance, the method comprising:
    characterizing the concentration of the at least one chemical substance through calculation from a mass of a sample of a plastic reference material candidate measured using a balance, a mass of an isotope-labeled chemical substance of the at least one chemical substance measured using a balance, and a signal intensity measured using a pyrolysis GC-MS instrument.

3. The method of claim 2, further comprising:
    weighing a mass of the at least one chemical substance to be measured and a mass of the isotope-labeled chemical substance of the at least one chemical substance,
    dissolving the at least one chemical substance, the isotope-labeled substance of the at least one chemical substance, and the plastic base material in a solvent,
    introducing a product resulting from evaporation of the solvent into a pyrolysis GC-MS instrument,
    determining a sensitivity correction factor of the at least one chemical substance to be measured and the isotope-labeled chemical substance of the at least one chemical substance, and
    correcting the concentration of the at least one chemical substance.

* * * * *